Jan. 1, 1946.   C. E. PHILLIMORE   2,392,183
RETARDED ACTION ELECTRIC SWITCH
Filed Nov. 2, 1942   2 Sheets-Sheet 1
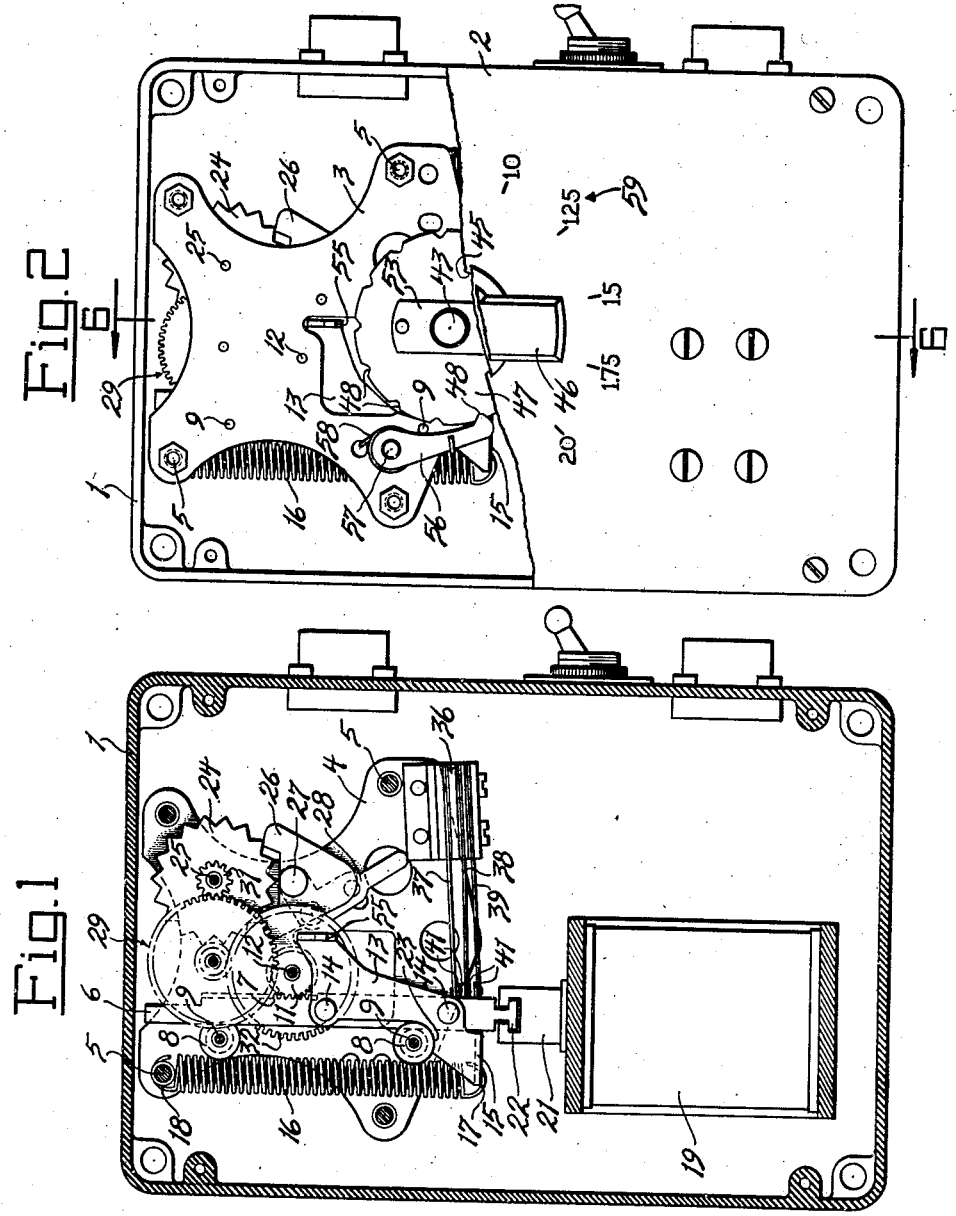
INVENTOR
CHARLES E. PHILLIMORE
BY Robert F. Miehle
ATTY

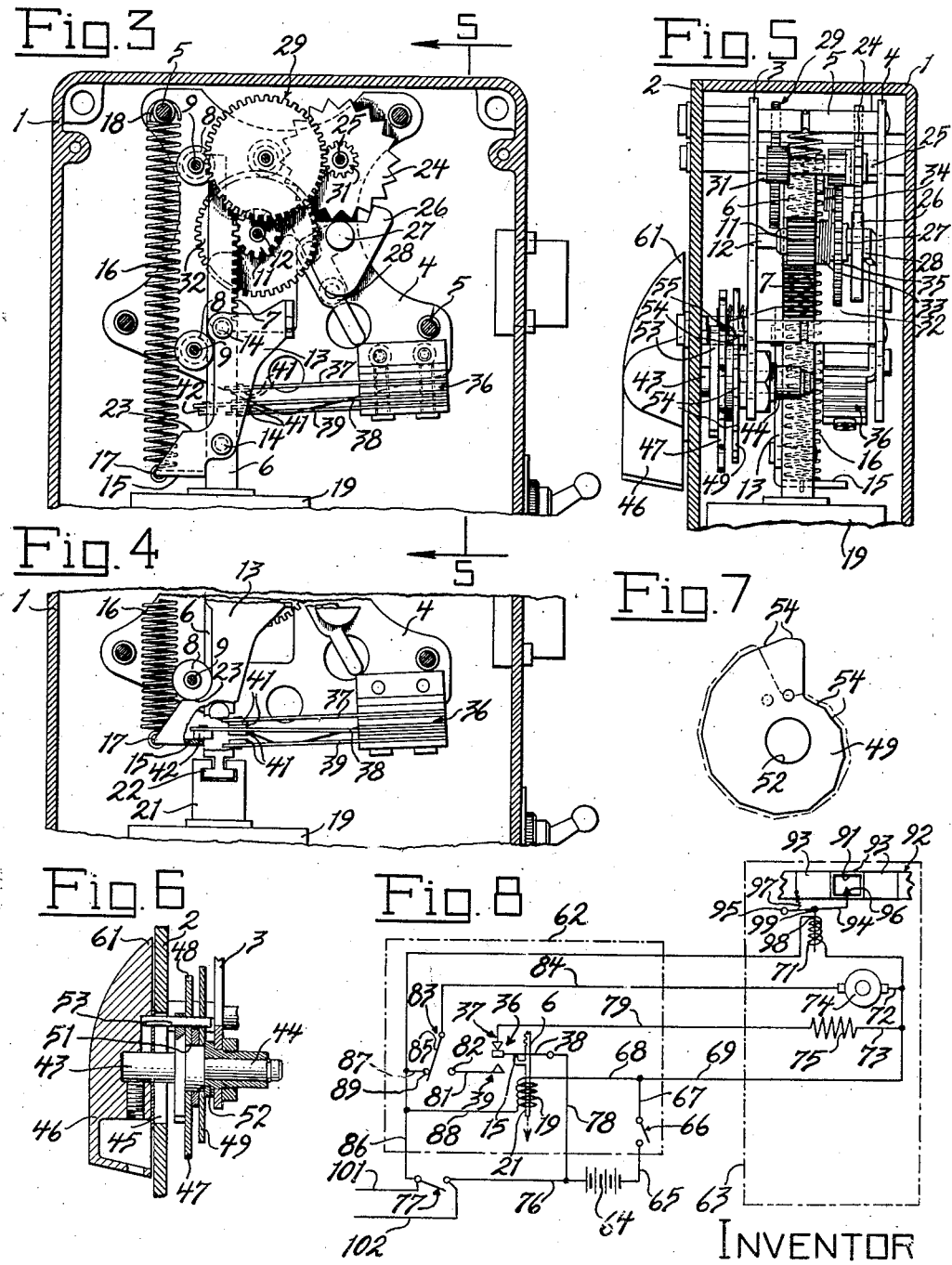

Patented Jan. 1, 1946

2,392,183

UNITED STATES PATENT OFFICE 2,392,183

RETARDED ACTION ELECTRIC SWITCH

Charles E. Phillimore, Chicago, Ill., assignor to The Bell & Howell Company, Chicago, Ill., a corporation of Illinois Application November 2, 1942, Serial No. 464,193

6 Claims. (Cl. 200—97)

My invention relates to a retarded action electric switch which is particularly adapted for use in jointly controlling a motion picture camera and a gun for photographically recording the firing of the gun with reference to a target or objective on which the gun is trained, the retarded action switch effecting operation of the camera for a predetermined interval after a common manual photographing and firing control has been actuated to non-photographing non-firing position, so that the trajectory of a projectile fired by the gun, taking place after the manual photographing and firing control has been actuated to non-photographing non-firing position, is photographically recorded by the camera.

Objects of the invention reside in the provision of a novel, effective and reliable retarded action electric switch, which is particularly adapted for the use stated above, which provides accurate timing of the delayed action, which provides for accurate and convenient adjustment of the interval of the delayed action, which provides for alternate energization of two controlled circuits as for alternately energizing a camera motor and a camera heater for equalizing the current drain, and a further object resides in the provision of additional switch means connected in such a manner as to conveniently provide for alternately placing a controlled circuit in or out of the control of the retarded action switch.

In the drawings—

Figure 1 is an elevational view partially in section of a photographic camera control mechanism embodying my invention;

Figure 2 is a similar elevational view with parts broken away;

Figure 3 is a fragmentary elevational view partially in section and similar to Figure 1 showing the mechanism in a different position than that in which it is shown in Figure 1;

Figure 4 is a fragmentary elevational view partially in section and similar to Figure 1 showing the mechanism in the same position as that in which it is shown in Figure 1 and having a part partially broken away and partially in section;

Figure 5 is a partial sectional view substantially on the line 5—5 of Figure 3;

Figure 6 is a partial sectional view substantially on the line 6—6 of Figure 2;

Figure 7 is a face view of the cam involved in the camera overrun operation period adjusting portion of the mechanism, hereinafter described; and Figure 8 is a diagrammatic view of the mechanism illustrating the electrical circuits involved therein.

Referring to the drawings, 1 designates a casing open at the front thereof and provided with a cover 2 closing the front thereof and detachably secured therewith in a usual manner, see particularly Figures 2 and 5, and a mechanism frame comprising vertically disposed parallel frame plates 3 and 4 secured together by spacing studs 5 is secured on the inner face of the cover 2 for enclosure within the casing 1.

A vertically disposed control bar 6, provided with a longtudinally extending gear rack 7, see Figures 1, 3 and 5, is mounted for longitudinal reciprocating movement between the frame plates 3 and 4 by means of vertically spaced rotatable flanged rollers 8 fixed on horizontal shafts 9 extending between and rotatably mounted on the frame plates and engaging the side of the bar opposite that on which the rack 7 is disposed, and a rotatable gear pinion 11 rotatably mounted on a horizontal shaft 12 extending between and rotatably mounted on the frame plates 3 and 4 and meshing with the rack 7 intermediate the engagements of the rollers with the bar.

A bracket 13 is secured, as designated at 14, on the bar 6 and is provided at its lower end with a horizontal upwardly facing abutment portion 15 extending transversely of the bar, and a vertically extending tension spring 16 has its lower end secured to the portion 15, as designated at 17, and has its upper end secured, as designated at 18, to one of the frame studs 5, and as so connected this spring yieldably actuates the bar 6 in one direction, namely upwardly.

A vertically disposed solenoid 19 is secured on the cover 2 below the bar 6, and a vertically reciprocable armature 21 of magnetic material is disposed under the control of the solenoid to be actuated in one direction, namely downwardly, when the solenoid is energized, and the armature is secured with the bar 6, as designated at 22 in Figures 1 and 4, so that the spring 16 actuates the bar and armature in one direction, namely, upwardly, and into one terminal position as shown in Figures 1 and 4 when the solenoid is de-energized and so that the solenoid actuates the armature and with it the bar in the other direction, namely downwardly, into an opposite terminal position as shown in Figures 3 and 5 against the influence of the spring when the solenoid is energized. Upward movement of the bar 6 is limited by an upwardly facing stop formation 23 on the bracket 13 engaging upwardly against the lower roller 8.

An escapement timing means comprises a usual rotatable toothed escapement wheel 24 fixed on a shaft 25 extending between and rotatably mounted on the frame plates 3 and 4 and a usual vibratory pallet 26, pivotally mounted as designated at 27 on a bracket 28 secured on the frame plate 4, and cooperating in a usual manner with the teeth of the escapement wheel to time the rotation of the wheel as it is urged angularly. See Figures 1, 3 and 5.

Transmission means is operative between the bar 6 and the escapement wheel 24 and includes usual reduction gearing, generally designated at 29, of which the gear pinion 11, meshing with the rack 7 of the bar 6, forms a part and constitutes the low speed terminal gear thereof and of which a gear pinion 31, secured on the escapement wheel shaft 25 for rotating the same, constitutes the high speed terminal gear thereof, this gearing also including a gear 32 fixed in a usual manner on the shaft 12 on which the gear pinion 11 is rotatably mounted.

The said transmission means also includes an automatic one way clutch operative in series with the reduction gearing and specifically operative between the relatively rotatable gears 11 and 32, and which comprises a helical clutch spring 33 having one end secured with the gear 32, as designated at 34 in Figure 5, and having the helix thereof surrounding and slightly tensioned on a hub 35 of the gear 11, the helix being arranged so that rotation of the gear 11 in a clockwise direction in Figures 1 and 3 incident to upward movement of the bar 6 under the influence of the spring 16 effects a driving connection through the gearing 29 and clutch resulting in the escapement timing means timingly retarding upward movement of the bar, and so that rotation of the gear 11 in a counter-clockwise direction incident to downward movement of the bar 6 under the influence of the solenoid 19 when energized is permitted independently of the escapement means resulting in uncontrolled fast downward movement of the bar.

A single pole double through electric control switch, generally designated at 36, is secured on the frame plate 4 and comprises three vertically spaced horizontal resilient switch blades 37, 38 and 39 provided with usual contacts 41 and so arranged that in an upper position of the intermediate or control blade 38 contacts 41 of the blades 37 and 38 are in contact for completing an electric circuit including these blades, as shown in Figures 1 and 4, and that in a lower position of the control blade 38 contacts 41 of the blades 38 and 39 are in contact for completing another electric circuit including these blades, as shown in Figure 3, these circuits being thus alternately closed with opposite vertical positioning of the control blade 38.

The control blade 38 is by its resiliency yieldably urged downwardly into closed circuit position with the lower switch blade 39, as shown in Figure 3, and the free end of this blade is extended and provided with a downwardly facing abutment button 42 which overlies the abutment portion 15 of the bracket 13 secured to and vertically movable with the control bar 6, the arrangement being such that when the bar 6 is actuated to its upper position by the spring 16, as shown in Figure 4, the portion 15 upwardly engages the button 42 and positions the control blade 38 in closed circuit relation with the upper switch blade 37, the yieldable urge of the spring 16 being stronger than that of the control blade.

The movement range of the control bar 6 is such that in lower positions thereof the abutment portion 15 is spaced below the abutment button 42, see Figure 3, and, upward movement of the control bar being retarded by the escapement timing mechanism as hereinbefore described, a predetermined period of time elapses in the upward movement of the control bar from a given lower position thereof before the abutment portion 15 engages the abutment button 42 and actuates the control blade 38 out of closed circuit relation with the lower switch blade 39 and thereafter actuates the control blade into closed circuit relation with the switch blade 37, the extent of said period being determined by said given or initial lower position of the control bar and being variable by adjustment of said given or initial lower position.

A shaft 43, see Figures 2, 5 and 6, is rotatably mounted on the frame plate 3, as designated at 44, and projects outwardly of the casing cover 2 axially through a relatively large circular opening 45 through the cover, and a manipulating knob 46 is secured on this shaft exteriorly of the cover for manually rotating the shaft. A disk 47, provided with angularly spaced notches 48, and a stop disk 49 have bores thereof, designated respectively at 51 and 52, engaged on the shaft 43, and a crank pin structure, fixed with the shaft and generally designated at 53, engages the knob 46, the disk 47 and the stop disk 49 and secures the same in angularly fixed relation on the shaft.

The stop disk is provided with a peripheral cam-like formation comprising a series of stop portions 54, as best shown in Figure 7, which are graduated or stepped radially of this disk to provide an adjustable upwardly facing stop structure. The bracket 13, secured on and vertically movable with the control bar 6 as hereinbefore described, is provided with a forwardly projecting downwardly facing stop formation 55 which is engageable downwardly on the stop disk to stop or limit downward movement of the control bar 6, see particularly Figure 5, angular adjustment of the stop disk presenting differently disposed stop portions 54 to the stop formation 55 and thus adjustably predeterminately fixing the lower position of the control bar or the amount of lost motion afforded between the control bar 6 and the control blade 38 of the electric control switch by the one way abutment connection comprising the abutment portion 15 and the abutment button 42. Figure 7 discloses in full lines the position of the stop disk in which the outermost of the stop portions 54 is in functioning position, and discloses in dot and dash lines the position of the stop disk in which the innermost of the stop formations 54 is in functioning position.

Accordingly, upward movement of the control bar 6 being retarded by the escapement timing mechanism, angular adjustment of the stop disk predeterminately adjusts the period of time from the initiation of upward movement of the control bar until the control blade 38 is moved out of closed circuit relation with the switch blade 39.

A pawl 56, see Figure 2, is pivotally mounted on the frame plate 3, as designated at 57, and is yieldably urged by a torsion spring 58 into engagement with the notches 48 of the disk 47 for retaining the stop disk 49 in selected angular positions, and an index scale 59 on the outer face of the cover 2, see Figure 2, cooperates with an index pointer 61 on the manipulating knob 46, see Figure 6, for indicating time period settings of the stop disk.

Referring to Figure 8, the dot and dash line rectangle 62 encloses the control mechanism and circuit connections thereof, which are enclosed within or carried with the casing 1 and cover 2, and the dot and dash line rectangle 63 indicates a photographic camera of the continuously operable sequential exposure type such as a motion picture camera and encloses devices and circuit connections associated with the camera.

An electric current source 64, such as an accumulator battery, has a conductor 65 connecting one pole thereof with one terminal of a current supply switch 66, and a conductor 67 is connected with the other terminal of this switch and divides into two branch conductors 68 and 69 of which the conductor 68 is connected to one terminal of the solenoid 19, and of which the conductor 69 leads to the camera 63 and is connected to one terminal of a solenoid 71 carried with the camera and has branch conductors 72 and 73 connecting it respectively with one terminal of an electric camera mechanism driving motor 74 and with one terminal of an electric heater 75 associated with the camera for heating the same.

A conductor 76 connects the other pole of the battery with one terminal of a primary control switch 77 and has a branch conductor 78 connecting it with the control blade 38 of the double pole double throw switch 36 hereinabove described. A conductor 79 connects the upper switch blade 37 of this switch with the other terminal of the heater 75, and a conductor 81 connects the lower switch blade 39 of this switch with one stationary contact 82 of a single pole double throw change over switch 83. A conductor 84 connects the movable contact member 85 of the switch 83 with the other terminal of the camera motor 74. A conductor 86 connects the other terminal of the primary control switch 77 with the other terminal of the camera carried solenoid 71, and has branch conductors 87 and 88 connecting it respectively with the other stationary contact 89 of the switch 83 and with the other terminal of the solenoid 19.

Still referring to Figure 8, the camera, indicated at 63, includes an exposure aperture 91 across which a sensitized sequential exposure frame photographic element 92, such as a motion picture film strip, is intermittently moved by the camera mechanism, not shown, as driven by the camera motor 74, for the progressive exposure of the sequential picture frames 93 of the photographic element, as is usual in cameras of the above mentioned type.

A recording element 94 is pivotally mounted, as indicated at 95 with reference to the camera and the exposure aperture or station 91 of the camera, for movement with reference to the film strip to position a recording portion 96 of the recording element into and out of the area of the exposure aperture or station to provide by exposure of the film strip at the exposure station different photographic recording effects on the film strip, the recording portion 96 being shown in Figure 8 as projecting into the area of the exposure aperture 91 for photographically recording its image on each exposure frame of the film strip as it is exposed at the exposure aperture 91 and being movable out of the area of the exposure aperture 91 for not recording its image on the successively exposed exposure frames of the film strip to provide different recording effects on the film strip as an incident of the film strip's progressive exposure in the camera.

The recording element 94 is yieldably actuated into image exposing position, as shown in Figure 8, by a tension spring 97, and a reciprocable armature 98 of magnetic material is disposed under the control of the solenoid 71 and is connected, as designated at 99, with the recording element 94 to move the recording element out of image effecting position against the influence of the spring 97 when this solenoid is energized, the spring 97 positioning the recording element in image exposing position when this solenoid is de-energized. Thus, alternate energization and de-energization of the solenoid 71 effects, as an incident of progressive exposure of the film strip, different recording effects on the film strip to produce a record on the film strip for the purpose hereinafter described.

Conductors 101 and 102 are connected respectively with the terminals of the primary control switch 77, so that this switch controls energization of another control circuit, not shown further, of which this switch and these conductors form a part, this additional control circuit being operative to control, jointly with the control by this switch of the camera related devices as hereinafter explained, an instrumentality separate from the camera such as a gun of the repeating type.

Assuming the current supply switch 66 to be in closed circuit position, the primary control switch 77, being included in the circuits of the solenoids 19 and 71 and the circuit of which the conductors 101 and 102 form a part, is operative to simultaneously alternately energize and de-energize these circuits.

Assuming the movable contact member 85 of the change over switch 83 to be positioned in closed circuit relation with the stationary contact 82, and in open circuit relation with the stationary contact 89, the switch 77, through the medium of the control switch 36 as controlled by the solenoid 19 as hereinbefore described, controls the alternate energization of the camera motor 74 and heater 75.

Accordingly, when the primary control switch 77 is in open circuit position, as shown in Figure 8, the results are that—the solenoids 19 and 71 being thus de-energized—the camera motor 74 is de-energized so that the camera mechanism is inoperative to photograph and the camera heater 75 is energized to heat the camera while the camera is inoperative to photograph by reason of the control blade 38 of the switch 36 being in open circuit relation with the switch blade 39 and in closed circuit relation with the switch blade 37; that the recording portion 96 of the recording element 94 is in exposing position; and that the gun control circuit, of which the conductors 101 and 102 form a part, is de-energized or is in non-firing condition. In this condition of the control mechanism the control bar 6 is at the upper end of its movement as shown in Figures 1 and 4.

Conversely, when the primary control switch 77 is in closed circuit position, the results are that—the solenoids 19 and 71 being thus energized—the camera motor 74 is energized so that the camera mechanism is operative to photograph and the camera heater 75 is de-energized to cut off the current from the heater for the purpose of eliminating the current drain of the heater during operation of the camera by reason of the control blade 38 of the control switch being in closed circuit relation with the switch blade 39 and in open circuit relation with the switch blade 37; that the recording portion 96 of the recording element 94 is in non-exposing position; and that the gun control circuit, of which the conductors 101 and 102 form a part, is energized or is in firing condition. In this condition of the control mechanism, the control bar 6 is at a lower position of its movement as shown in Figure 3, such lower position being adjustable by angular positioning of the stop disk 49 as hereinbefore described.

Recalling that the one way abutment connection between the control bar 6 and the control blade 38 of the switch 36, exemplified by the abutment portion 15 and the abutment button 42, affords lost motion between the control bar and the control blade with respect to upward movement of the control bar in a lower range of movement of the control bar, which range is adjustably limited by the stop disk 49, the control blade 38 remains in camera motor energizing position throughout this range of movement of the control bar and the control bar is accordingly movable into, within and out of a camera operation range of movement.

Recalling also that the escapement timing means, hereinbefore described, is operative to retard movement of the control bar 6 throughout its upward movement including movement of the control bar within and in the direction out of the camera operation range thereof and that the escapement means accordingly retards movement of the switch blade 38 of the switch 36 out of closed circuit or camera operating relation with the switch blade 39, it follows that operation of the camera is continued for a period of time, predeterminately adjustable by the stop disk 49, after the primary control switch 77 is moved from closed circuit (photographing and firing) position to open circuit (non-photographing non-firing) position so that operation of the camera to photograph continues for a period of time after firing of the gun has ceased, that is to say, the camera operation overruns that of the gun, so that the trajectory of a projectile fired by the gun, taking place after the primary control switch has been actuated into non-photographing non-firing position, is photographically recorded by the camera, this overrun operation of the camera occurring automatically or without requiring the attention of the operator.

It will be observed that, the recording element 94 as controlled by the primary control switch 77 through the medium of the solenoid 71 is actuated instantaneously into its opposite exposing and non-exposing positions respectively with actuation of the switch 77 into its opposite closed circuit and open circuit positions. As a result the recording element automatically produces contrasting recording effects on the film strip 92 directly related with the positioning of the switch 77. Accordingly, the normal and overrun operation periods of the camera are indicated on the film, so that, when the film strip is developed and projected, these periods are indicated.

As applied to aircraft, the primary control switch 77 may be carried on the aircraft control or "stick" for convenience to the pilot and so may be termed the "stick switch."

As above indicated, the overrun operation of the camera is effective when the movable contact member 85 of the change over switch 83 is positioned in closed circuit relation with the stationary contact 82 and in open circuit relation with the stationary contact 89. When it is desired to eliminate the overrun operation of the camera, the movable contact member 85 of the switch 83 is positioned in closed circuit relation with the stationary contact 89 and in open circuit relation with the stationary contact 82, with the result that the camera motor circuit includes the primary control switch 77 for direct control thereby and that the switch blade 39 is cut out of the motor circuit, the control bar 6 being still actuated as before, but only being effective to open and close the camera heater circuit.

While I have thus described my invention, I do not wish to be limited to the precise details described, as changes may be readily made without departing from the spirit of my invention, but having thus described my invention, I claim as new and desire to secure by Letters Patent the following:

1. In a circuit control device, the combination of a reciprocable control member yieldably urged in one direction of its movement, an electric switch yieldably urged into one of its circuit control positions, a one way abutment connection operative between said control member and said switch to actuate said switch out of said circuit control position with actuation of said control member under its yieldable urge in its said direction and providing a range of movement of said control member with said switch remaining in said circuit control position, a selectively energizable electromagnetic device operative on said control member to actuate the same in the other direction of movement thereof, stop means operative to limit the range of movement of said control member, escapement timing means, and an automatic one way clutch operative to retard by said escapement means movement of said control member in its said yieldably urged direction.

2. In a circuit control device, the combination of a reciprocable control member provided with a gear rack extending longitudinally of the movement thereof and yieldably urged in one direction of its movement, an electric switch yieldably urged into one of its circuit control positions, a one way abutment connection operative between said control member and said switch to actuate said switch out of said circuit control position with actuation of said control member under its yieldable urge in its said direction and providing a range of movement of said control member with said switch remaining in said circuit control position, a selectively energizable electromagnetic device operative on said control member to actuate the same in the other direction of movement thereof, stop means operative to limit the range of movement of said control member, escapement timing means, and transmission means operative between said control member and said escapement means comprising a revoluble gear meshing with said rack and an automatic one way clutch operative in series with said gear to retard by said escapement means movement of said control member in its said yieldably urged direction.

3. In a circuit control device, the combination of a longitudinally reciprocable control bar provided with a longitudinally extending gear rack and yieldably urged in one direction of its movement, an electric switch yieldably urged into one of its circuit control positions, a one way abutment connection operative between said control bar and said switch to actuate said switch out of said circuit control position with actuation of said control bar under its yieldable urge in its said direction and providing a range of movement of said control bar with said switch remaining in said circuit control position, a selectively energizable electromagnetic device having its armature reciprocable correspondingly with said control bar and connected therewith for actuating the same in the other direction of movement thereof, stop means operative to limit the range of movement of said control bar, escapement timing means, and transmission means operative between said control bar and said escapement means comprising a revoluble gear meshing with said rack and an automatic one way clutch operative in series with said gear to retard by said escapement means movement of said control bar in its said yieldably urged direction.

4. In a circuit control device, the combination as recited in claim 1 and further characterized in that said stop means includes an adjustable stop member operative to adjustably limit movement of said control member in said other direction of movement thereof.

5. In a circuit control device, the combination of a reciprocable control member yieldably urged in one direction of its movement, a double throw electric switch yieldably urged into a first of its closed circuit positions, a one way abutment connection operative between said control member and said switch to actuate said switch into the second of its closed circuit positions with actuation of said control member under its yieldable urge in its said direction and providing a range of movement of said control member with said switch remaining in said first closed circuit position, a selectively energizable electromagnetic device operative on said control member to actuate the same in the other direction of movement thereof, stop means operative to limit the range of movement of said control member, and timing means operative on said control member to retard movement thereof in said first mentioned direction thereof.

6. In a circuit control device, the combination of a reciprocable control member yieldably urged in one direction of its movement, an electric switch yieldably urged into closed circuit position, a oneway abutment connection operative between said control member and said switch to actuate said switch out of closed circuit position with actuation of said control member under its yieldable urge in its said direction and providing a range of movement of said control member with said switch remaining in closed circuit position, an electromagnetic device operative on said control member to actuate the same in the other direction of movement thereof, stop means operative to limit the range of movement of said control member, timing means operative on said control member to retard movement thereof in said first mentioned direction thereof, a second electric switch in circuit with said electromagnetic device for selectively energizing the same, and a double throw third electric switch forming part of a controlled circuit and operative to alternately connect said first and second switches in said controlled circuit.

CHARLES E. PHILLIMORE.